(12) United States Patent
Gorrebeeck et al.

(10) Patent No.: US 10,814,259 B2
(45) Date of Patent: Oct. 27, 2020

(54) DEVICE FOR SEPARATING LIQUID FROM A GAS STREAM COMING FROM A LIQUID INJECTED VACUUM PUMP OR COMPRESSOR

(71) Applicant: ATLAS COPCO AIRPOWER, NAAMLOZE VENNOOTSCHAP, Wilrijk (BE)

(72) Inventors: Niels Gorrebeeck, Wilrijk (BE); Andries Jan F. Desiron, Wilrijk (BE); Rudolf Jozef M. Beuckelaers, Wilrijk (BE); Tomasz Mirecki, Wilrijk (BE); Ruben Pieter Vyvey, Wilrijk (BE); Johan Gustaaf K. Aerts, Wilrijk (BE); Willem Everaert, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 7 days.

(21) Appl. No.: 15/569,556

(22) PCT Filed: Apr. 13, 2016

(86) PCT No.: PCT/BE2016/000018
§ 371 (c)(1),
(2) Date: Oct. 26, 2017

(87) PCT Pub. No.: WO2016/172770
PCT Pub. Date: Nov. 3, 2016

(65) Prior Publication Data
US 2018/0311601 A1    Nov. 1, 2018

Related U.S. Application Data

(60) Provisional application No. 62/115,014, filed on Apr. 30, 2015, provisional application No. 62/252,832, filed on Nov. 9, 2015.

(30) Foreign Application Priority Data

Feb. 2, 2016  (BE) .................................. 2016/5084

(51) Int. Cl.
*B01D 45/12*    (2006.01)
*B01D 45/16*    (2006.01)
(Continued)

(52) U.S. Cl.
CPC ............. *B01D 45/16* (2013.01); *B01D 45/02* (2013.01); *B01D 45/12* (2013.01); *B04C 5/28* (2013.01);
(Continued)

(58) Field of Classification Search
CPC ........ B01D 45/16; B01D 45/12; B01D 45/02; B04C 5/28; F04C 29/026; F04C 29/0007; F04B 39/16
See application file for complete search history.

(56) References Cited

U.S. PATENT DOCUMENTS

| | | | |
|---|---|---|---|
| 2,546,246 A | | 3/1951 | Whiton et al. |
| 2,575,607 A | * | 11/1951 | Wallin .................... B04C 5/103 55/392 |

(Continued)

FOREIGN PATENT DOCUMENTS

| | | |
|---|---|---|
| DE | 10-2010-009722 A1 | 9/2011 |
| EP | 1915940 A1 | 4/2008 |
| WO | 2014/132441 A1 | 9/2014 |

OTHER PUBLICATIONS

International Search Report (ISR) dated Sep. 9, 2016.

*Primary Examiner* — Dung H Bui
(74) *Attorney, Agent, or Firm* — Bacon & Thomas, PLLC (57) ABSTRACT

A device for separating liquid from a gas stream within a liquid injected vacuum pump or compressor, said device comprising: two communicating vessels having a common
(Continued)

section extending over at least a part of the height; an inlet opening positioned on the opposite side of the common section; at least two bucket shaped vessels, each provided within one of the two communicating vessels; a lid comprising an outlet opening; wherein at least one of the two bucket shaped vessels forms a fluid passage between the wall of the communicating vessel and the wall of the bucket shaped vessel for allowing a fluid to pass there through.

20 Claims, 7 Drawing Sheets (51) Int. Cl.
*B01D 45/02* (2006.01)
*B04C 5/28* (2006.01)
*F04C 29/02* (2006.01)
*F04C 29/00* (2006.01)
*F04B 39/16* (2006.01)

(52) U.S. Cl.
CPC ........ *F04C 29/0007* (2013.01); *F04C 29/026* (2013.01); *F04B 39/16* (2013.01)

(56) References Cited

U.S. PATENT DOCUMENTS

| | | | | |
|---|---|---|---|---|
| 2,904,130 A * | 9/1959 | Chapler, Jr. | ............. | B04C 5/28 55/344 |
| 3,543,931 A * | 12/1970 | Rastatter | ............. | B04C 5/28 209/728 |
| 3,912,469 A | 10/1975 | Ewan et al. | | |
| 4,286,973 A * | 9/1981 | Hamlin | ............. | B01D 50/004 261/116 |
| 4,853,014 A * | 8/1989 | Bloch | ............. | B08B 9/0325 96/228 |
| 5,053,126 A | 10/1991 | Krasnoff | | |
| 6,279,556 B1 * | 8/2001 | Busen | ............. | F01M 13/04 123/572 |
| 7,419,521 B2 * | 9/2008 | Oh | ............. | A47L 9/1641 55/337 |
| 7,540,894 B2 * | 6/2009 | Ni | ............. | A47L 9/1625 15/353 |
| 7,563,296 B2 * | 7/2009 | Ni | ............. | A47L 9/1608 15/353 |
| 7,604,674 B2 * | 10/2009 | Han | ............. | A47L 9/1641 15/347 |
| 7,753,976 B2 * | 7/2010 | Hyun | ............. | A47L 9/1608 15/352 |
| 7,879,121 B2 * | 2/2011 | Oh | ............. | A47L 9/1641 15/352 |
| 7,998,260 B2 * | 8/2011 | Ni | ............. | A47L 9/1658 15/326 |
| 8,302,252 B2 * | 11/2012 | Hyun | ............. | A47L 9/1641 15/300.1 |
| 8,512,451 B1 * | 8/2013 | Heumann | ............. | B04C 5/04 55/348 |
| 8,945,290 B2 * | 2/2015 | Nakamura | ............. | B04C 5/14 96/228 |
| 9,273,646 B2 * | 3/2016 | Oelpke | ............. | F02M 35/0216 |
| 2010/0000185 A1 | 1/2010 | Hyun et al. | | |
| 2010/0224073 A1 * | 9/2010 | Oh | ............. | A47L 9/1641 96/416 |
| 2014/0305311 A1 | 10/2014 | Nakamura | | |
| 2015/0343366 A1 * | 12/2015 | Wuebbeling | ............. | B01D 50/002 55/337 |
| 2016/0288019 A1 * | 10/2016 | Ernst | ............. | B01D 19/0026 |
| 2018/0036653 A1 * | 2/2018 | Ernst | ............. | B01D 19/0057 |

* cited by examiner

DEVICE FOR SEPARATING LIQUID FROM A GAS STREAM COMING FROM A LIQUID INJECTED VACUUM PUMP OR COMPRESSOR

This invention relates to a device for separating liquid from a gas stream within a liquid injected vacuum pump or compressor, said device comprising: two communicating vessels having a bottom plate and a lateral wall extending from said bottom plate and having a height H1, said two vessels having a common section extending over at least a part of said height H1, wherein the common section is created by cutting said lateral wall along the height H1 so as to create two wall parts and adjoining said wall parts over at least a part of said height H1; an inlet opening positioned on the opposite side of the common section; at least two bucket shaped vessels, each comprised within one of the two communicating vessels and a lid positioned on the opposite side of the bottom plate and comprising an outlet opening.

BACKGROUND OF THE INVENTION

Devices for separating solid or liquid impurities from a fluid flow are commonly used within vacuum systems. Some examples can be found in the field of vacuum cleaners such as in US 2010/000,185 A1 in the name of LG Electronics INC, or U.S. Pat. No. 2,546,246 A in the name of Prat Daniel Corp, or in the field of removing air pollutants such as particulate matter or acidic gases from air such as in U.S. Pat. No. 3,912,469 A in the name of Lone Star Steel CO.

The above mentioned examples describe devices comprising cyclone system mounted in parallel and comprising a common inlet for the air flow. After passing the inlet opening, the flow is directed through the parallel mounted cyclones, which remove the impurities due to the circularly induced flow. The impurities are typically allowed to fall under the gravitational force and are collected at the bottom of each cyclone. The purified air is directed through an outlet typically positioned on the opposite side from the impurities collector and further used within the system.

When such systems are tested to be introduced within a vacuum pump or a compressor for the removal of liquid from a gas stream flow, a plurality of drawbacks are being identified, such as the dimension of the system.

If we take the example of a vacuum pump, for which the aim is to achieve a pressure value at the outlet as small as possible, the volume occupied by such a system would be too big.

Another identified drawback is the impossibility of predicting the behavior of the fluid. Tests have shown that for such a configuration, the fluid does not use the two cyclones at the same time even if they are provided with a common inlet. Accordingly, the flow will either take the route of one cyclone or of the other, depending on which one of the two has a smaller pressure value within the cyclone, which makes it impossible to predict or calculate the parameters of the system such as the optical dimensions of different components.

Another drawback of such systems is the fact that within a vacuum pump or a compressor the filtration needs to be achieved for different phases of the fluid such as solid, liquid, vapor or a combination thereof, depending on the pressure achieved at the inlet of the vacuum pump or at the outlet of the compressor. Since a calculation of the system parameters is not possible, such systems would not allow a user to obtain the required results for all working pressures.

Yet another drawback is that such configurations cannot maintain a good quality of the liquid for a good liquid injection. Accordingly, the identified systems do not maintain a continuous flow of liquid in the impurities collector, which allows the formation of different temperature zones and potentially the deposit of solid impurities within said collector which can potentially cause blockages of the vacuum pump or of the compressor.

Taking the above mentioned drawbacks into account, it is an object of the present invention to provide a system that allows an overall reduction in footprint of the vacuum pump or of the compressor.

It is another object of the present invention to provide a system that allows a more accurate calculation of the system parameters such as the optimal size of different components and the liquid concentration at the outlet of the liquid separator.

Yet another object of the present indention is to maintain a constant temperature of the collected liquid and accordingly a good quality of the collected liquid for further using it in liquid injection.

SUMMARY OF THE INVENTION

The present invention solves at least one of the above and/or other problems by providing a device for separating liquid from a gas stream within a liquid injected vacuum pump or compressor, said device comprising:
  two communicating vessels having a bottom plate and a lateral wall extending from said bottom plate and having a height H1, said two vessels having a common section extending over at least a part of said height H1, wherein the common section is created by cutting said lateral wall along the height H1 so as to create two wall parts and adjoining said wall parts over at least a part of said height H1;
  an inlet opening positioned on the opposite side of the common section;
  at least two bucket shaped vessels, each provided within one of the two communicating vessels;
  a lid comprising an outlet opening, which in this case is preferably positioned on the opposite side of the bottom plate and;
whereby:
  at least one of the two bucket shaped vessels forms a fluid passage between the wall of the communicating vessel and the wall of the bucket shaped vessel for allowing a fluid to pass there through.

Indeed, by providing said two communicating vessels, not only the inlet opening is common, but a common space is also created for collecting the liquid from the fluid passing through the fluid passage of one of the two communicating vessels and the liquid collected from the fluid passing through the other communicating vessel.

Because of such a common space, the liquid dripping from the fluid flow creates a continuous movement within the collected liquid, which prevents impurities from depositing on the bottom plate. Another benefit of such created movement is the fact that a constant temperature of the liquid is maintained.

By keeping the temperature constant, the components of the vacuum pump or of the compressor positioned downstream of the liquid separator are being protected. Accordingly, if the temperature of the collected liquid is higher than a set value, the system will preferably direct said collected liquid through a cooling section and possibly through a filtration section. If the temperature of the collected liquid is not exceeding said set value, the system will direct the collected liquid to the vacuum pump or compressor for performing liquid injection. Preferably but not limiting to, the system will first direct the liquid through a filtration section and only afterwards to the vacuum pump or compressor for performing liquid injection.

If the collected liquid would have different temperature regions, the system would experience oscillations which would lead to a shorter life span of different components of the vacuum pump or of the compressor and accordingly to higher maintenance costs.

Because of the design of said two communicating vessels, the fluid flowing though the inlet opening is split up in two flows at all times. Tests have shown that such a behavior is achieved at any working pressure. Because of this, the pressure values within the two communicating vessels will be approximately equal which means that the fluid would not exclusively flow via one of the two possible paths, but the fluid flow will be split between the two communicating vessels, increasing the efficiency and allowing for an accurate calculation of the system parameters snob as the dimensions of different components and the liquid concentration at the outlet of the liquid separator.

Because the flow is spilt into two approximately equal flows, the footprint of the overall vacuum pump or compressor can be reduced, which allows an easier transportation, lower manufacturing costs and better results in terms of liquid filtration.

In the context ox the present invention, it is to be understood that said lid can be also positioned to cover a part of the lateral wall that would comprise in this case the outlet opening.

The design characteristics of the present device allow for a significant quantity of liquid to be collected, within the volume determined between the bottom plate and the bucket shaped vessels over the height $\Delta H$ ($\Delta H = H1 - H2$). In a preferred embodiment, the liquid is allowed to collect within at most 90% of said volume to be able to achieve good results.

In a preferred embodiment according to the present invention, at least one of the two bucket shaped vessels has a height $H2$ at least 10% smaller than $H1$.

In a preferred embodiment, at least one of the two bucket shaped vessels comprises one or more holes at the bottom, for allowing fluid to pass there through. Because such holes determine the route the fluid will have to take in order to leave the liquid separator, the fluid will follow the fluid passage between the bucket shaped vessels and the wall of the communicating vessels in a roughly circular movement until reaching the bottom of said bucket shaped vessel. When the flow reaches the region between the bottom plate and the bottom of the bucket shaped vessels, it will flow through said one or more holes and further through said outlet opening. Because of said circular movement, the liquid will be removed due to the mechanical impact of the liquid particles with the lateral walls of the communicating vessels and the wall of the bucket shaped vessel, due to the action of the centrifugal force and the gravitational force and will be collected on the bottom plate.

Preferably, each of the two bucket shaped vessels comprises one or more holes. Because of such a design characteristic, the efficiency of the system is increased.

In a preferred embodiment according to the present invention, the device further comprises a liquid drainage on the lateral wall of the two communicating vessels.

Preferably, the bottom plate of the two communicating vessels creates a slope having, in an upwardly directed position of the device, the lowest point of contact with the lateral wall on the side comprising the liquid drainage and the highest point of contact with the lateral wall on the opposite side.

It goes without saying that, it is to be understood that with "the lowest point of contact with the lateral wall" is meant the point of contact closest to the location within the communicating vessels where, during use of the device, separated liquid will naturally be collected under gravitational influence and the "highest point of contact with the lateral wall" is meant the point of contact which is chosen the farthest from this location, such that a slope is created.

Because of such a slope, the liquid is being directed to the liquid drainage more easily, fact that allows for a good quality of the liquid to be maintained. However, a continuous flow of liquid is easily maintained within the two communicating vessels, which eliminates the risk of impurities to deposit on the bottom plate.

The present invention is further directed to a method for separating liquid irons a gas stream within a liquid injected vacuum pump or compressor system, said method comprising the steps of:

providing two communicating vessels having a bottom plate and lateral walls extending from said bottom plate and having a height $H1$, said two vessels being provided with a common section extending over at least a part of said height $H1$, wherein the common section is created by cutting said lateral wall along the height $H1$ so as to create two wall parts and adjoining said wall parts over at least a part of said height $H1$ and positioning said common section on the opposite side of an inlet opening;

providing at least one bucket shaped vessel within each of the two communicating vessels;

whereby the method further comprises the steps of:

providing a fluid passage between the wall of each of the two communicating vessels and the wall of each of the two bucket shaped vessels for allowing a fluid to pass there through;

directing a fluid flow through said inlet opening and splitting the fluid flow from said inlet opening into two flows directed through the fluid passage;

collecting the liquid dripping from said fluid flowing through the two communicating vessels on the bottom plate; and providing a lid comprising an outlet opening, which in this case is preferably provided on the opposite side of the bottom plate, and directing the fluid passing through said fluid passage through the outlet opening.

BRIEF DESCRIPTION OF THE DRAWINGS

With the intention of better showing the characteristics of the invention, a preferred layout of a device for separating liquid from a gas stream and respective method according to the present invention are described hereinafter by way of an example without any limiting nature, with reference to the accompanying drawings, wherein.

DETAILED DESCRIPTION OF THE INVENTION

Figure 1:
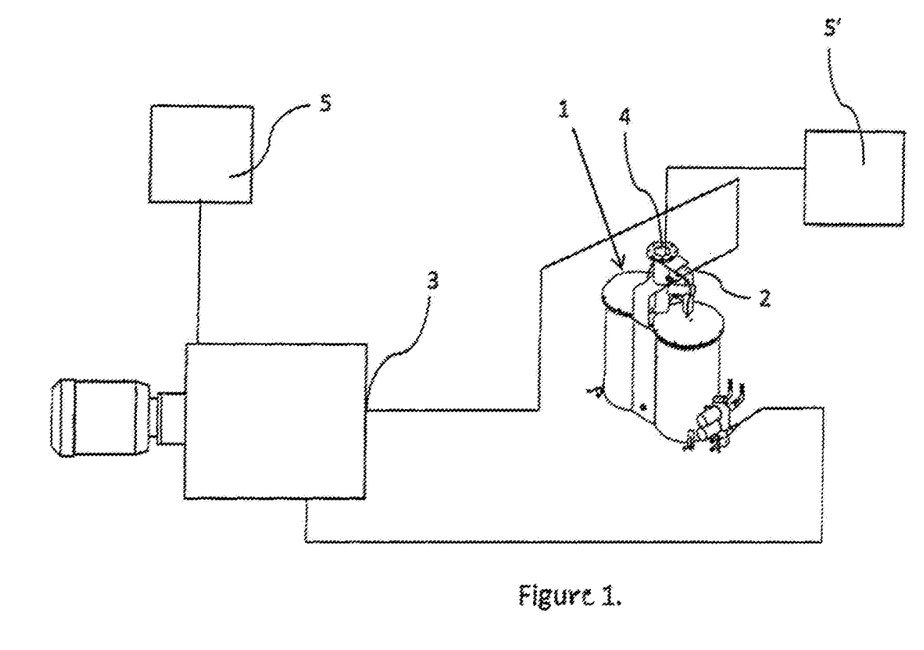
FIG. 1 schematically represents a vacuum pump or a compressor comprising a device according to the present invention FIGS. 2 and 4 schematically represent a device according to the present invention for separating liquid from a gas stream.

FIG. 1 shows system comprising a device 1 for separating liquid from a gas stream having an inlet opening 2 connected to the outlet 3 of a vacuum pump and an outlet opening 4, which can be further connected to an external network 5'. The inlet of the vacuum pump is further connected to an external process 5.

If the system would comprise a compressor instead of a vacuum pump, the component 5 could represent an inlet filter of such compressor, while reference number 3 would represent the outlet of the compressor and element 5' would represent the external process and/or a pressure vessel.

The device 1 for separating liquid from a fluid within a vacuum pump or a compressor (FIG. 2) comprises two communicating vessels 6 having a bottom plate 7 and a lateral wall 8 extending from said bottom plate 7 and having a height H1, said two vessels 6 having a common section 9 (FIG. 3) extending over at least a part of said height H1, wherein the common section 9 is created by cutting said lateral wall 8 along the height H1 so as to create two wall parts and adjoining said wall parts over at least a part of said height H1. The device 1 further comprises an inlet opening 2 positioned on the opposite side of the common section 9.

Figure 2:
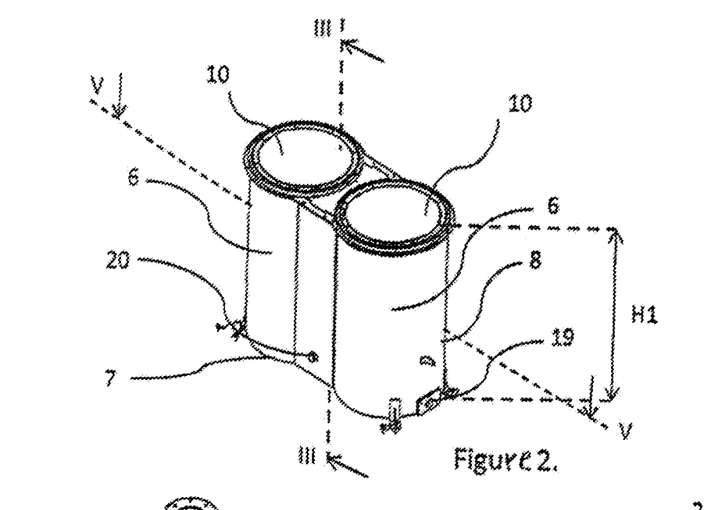
Figure 3:
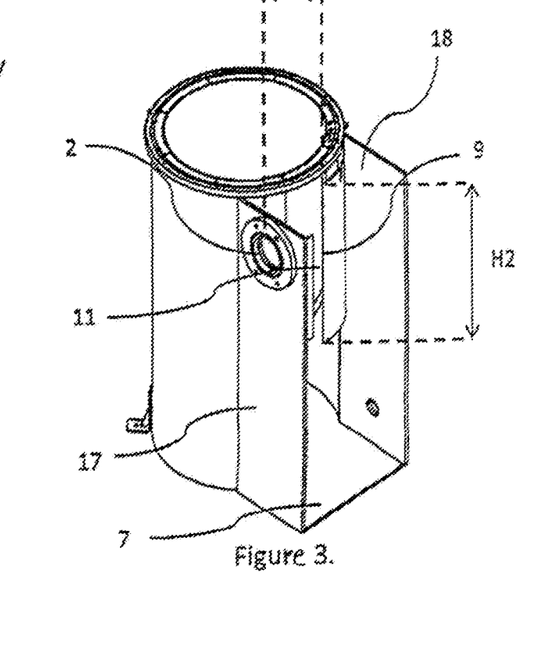
FIGS. 3 and 5 disclose a cross-section according to lines III-III and V-V in FIG. 2.

Within each of the two communicating vessels 6 is provided at least one bucket shaped vessel 10. Preferably, at least one of said bucket shaped vessels 10 allows for the formation of a fluid passage 11 between the lateral wall of the communicating vessel 6 in which said bucket shaped vessel 10 is provided and the wall of said bucket shaped vessel 10.

Because the inlet opening 2 is positioned on the opposite side from the common section 9, a distance y is created between said inlet opening 2 and the common section 9.

Accordingly, during operation of the system, after the fluid passes through said inlet opening 2, it will travel along the distance y and will be split into two separate flows by the common section 9.

Preferably, but not limited to, such a device 1 or liquid separator is positioned downstream of the vacuum pump and/or downstream of the compressor for achieving a gas stream of a very high purity, such gas stream being further used in an external network 5' or an external process 5.

Said distance y plays an important role in achieving an efficient liquid separation at any working pressure, as will be further explained.

Accordingly, when the vacuum pump is working within the high range of vacuum levels, the fluid stream entering the liquid separator is at a very low speed. In such a case, as the fluid traverses the distance y, a first liquid separation is achieved, since a part of the liquid particles falls under the action of gravitational force directly on the bottom plate 7. The rest of the fluid is further split by the common section 9 in two flows.

Further on, the fluid is being guided through the fluid passage 11, wherein a liquid separation is further achieved due to the mechanical impact of the liquid particles with the lateral walls 8 of the communicating vessels 6 and the wall of the bucket shaped vessel 10, because of the action of the centrifugal force and the gravitational force acting upon the liquid particles.

Accordingly, at the moment when the fluid stream reaches the bottom of the bucket shaped vessels 10, most of the fluid particles, typically between 90% and 95%, have been removed from the gas stream and collected on the bottom plate 7.

Preferably, said fluid passage 11 is being configured such that a fluid passing through it is being directed through the outlet opening 4 and used further in the external network 5' if the system comprises a vacuum pump or is used in the external process 5 if the system comprises a compressor.

Figure 4:
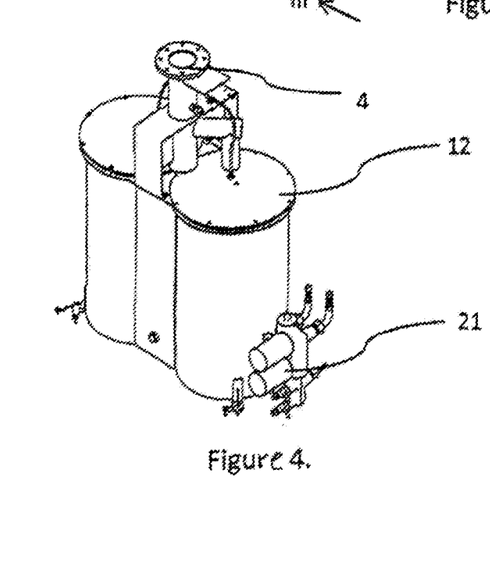

Preferably, said outlet opening 4 is positioned on a lid 12 (FIG. 4). Said lid 12 can be placed for example opposite from the bottom plate 7 or on the lateral wall 8 to cover at least a part thereof. In this case, said lid 12 is preferably positioned on the opposite side of the bottom, plate 7, covering at least a part of the surface of the two communicating vessels 6.

Tests have shown that, when the vacuum pump is working within the high range of vacuum levels, the fluid entering the fluid passage 11 achieves the required purity within the first part of the passage because the speed of such fluid is low enough and the gravitational force acting upon the fluid particles is sufficient. In such a case a vortex is not being created within the two communicating vessels 6, but simply a guidance of the fluid through the fluid passage 11. It has also been noticed, that at such high vacuum levels the fluid entering within the inlet opening 2 is mostly containing liquid particles.

When the vacuum pump is working at lower vacuum levels, the fluid entering the inlet opening 2 comprises liquid particles, particles in vapor and gaseous state. Such fluid has a higher speed than when the vacuum pump is working within the high range of vacuum levels, fact that determines the creation of vortexes within the two communicating vessels 6, as the fluid passes through the fluid passage 11. Also, it is considered that the quantity of liquid dropping as the fluid travels through the distance y between the inlet opening 2 and the common section 9 is less than for the high vacuum range. For such a case, most of the liquid particles are being removed from the gas stream as the fluid travels through the fluid passage 11 due to the mechanical impact with the walls, the centrifugal force and gravitational force applied upon the liquid particles, as previously explained. Such a working principle is also valid for the case in which the device 1 comprises a compressor and for the entire working range of such compressor.

Accordingly, when the fluid reaches the lowest point of the bucket shaped vessels 10, the liquid is separated from the gas stream and the required purity is achieved.

In an embodiment according to the present invention, but not limiting to, each of the two communicating vessels 6 comprises an outlet pipe which is further connected to create said common outlet opening 4.

Because part of the liquid is being collected on the bottom plate 7 as the fluid traverses the distance y and part of the liquid is collected as the fluid passes through the fluid passage 11, the temperature of the collected liquid is maintained at an approximately constant level throughout the entire time the vacuum pump or compressor functions. Moreover, as the vacuum pump or compressor is started, such a structural feature will enable the collected oil to increase in temperature more easily.

Because the temperature of the collected fluid is maintained at an approximately constant level, a good mixture of the liquid is achieved as such liquid is collected, which ensures a good quality of the collected liquid throughout the functioning time of the vacuum pump or compressor.

If the temperature of the collected liquid would not be kept approximately constant, there would be an increased risk of condensation to form, which effects the results of the liquid separator and further on the functioning of the vacuum pump or compressor when the liquid is recirculated.

In the context of the present invention, it is to be understood that a vacuum pump or a compressor can be of a type that is selected from a group comprising: a single screw compressor, a double screw compressor, a scroll compressor, a turbo compressor, a single screw vacuum pump, a double screw vacuum pump, a single toothed vacuum pump, a double toothed vacuum pump, a claw vacuum pump, a scroll vacuum pump, a turbo vacuum pump, a screw vacuum pump, a rotary vane vacuum pump, etc.

In a preferred embodiment said lid 12 is placed to cover said at least two bucket shaped vessels 10 and the two communicating vessels 6, on the opposite side of said bottom plate 7.

Because the liquid separator according to the present invention has a common inlet opening 2 and a common outlet opening 4, as previously described, the two communicating vessels 6 are not acting as two vessels connected in parallel, but as one vessel in which the flow is divided into two flows.

In another embodiment according to the present invention, at least one of the two bucket shaped vessels has a height H2, at least 10% smaller than H1.

Such a structural feature allows the fluid to traverse a sufficiently long distance around the bucket shaped vessels 10 such that the liquid is extracted from the flow, but at the same time it allows the device 1 to keep a quantity of liquid on the bottom plate 7, at a level sufficiently low such that there is no contamination risk from a potential recombination of the gas stream with the collected liquid before being directed towards the outlet opening 4.

In the context of the present invention it is to be understood that the height H2 of said at least two bucket shaped vessels 10 can differ from one another. Accordingly, one of the two vessels 10 can have a height H2 bigger or smaller than the height of the other bucket shaped vessel 10. Furthermore, the difference between the height H2 of at least one of the two bucket shaped vessels 10 and the height H1 of the two communicating vessels 6 can be different from 10%.

Preferably but not limiting to, the two communicating vessels 6 have the same height H1 and/or the at least two bucket shaped vessels 10 have the same height H2.

In the context of the present invention it is to be understood that there can be one or more than one bucket shaped vessel 10 per one of the two or even for each of the two communicating vessels 6.

In a preferred embodiment according to the present invention, the device 1 comprises means for directing the fluid flow to the outlet opening 4 after said fluid traverses at least part of the height H2 of each of the two bucket shaped vessels 10.

Figures 5, 6:
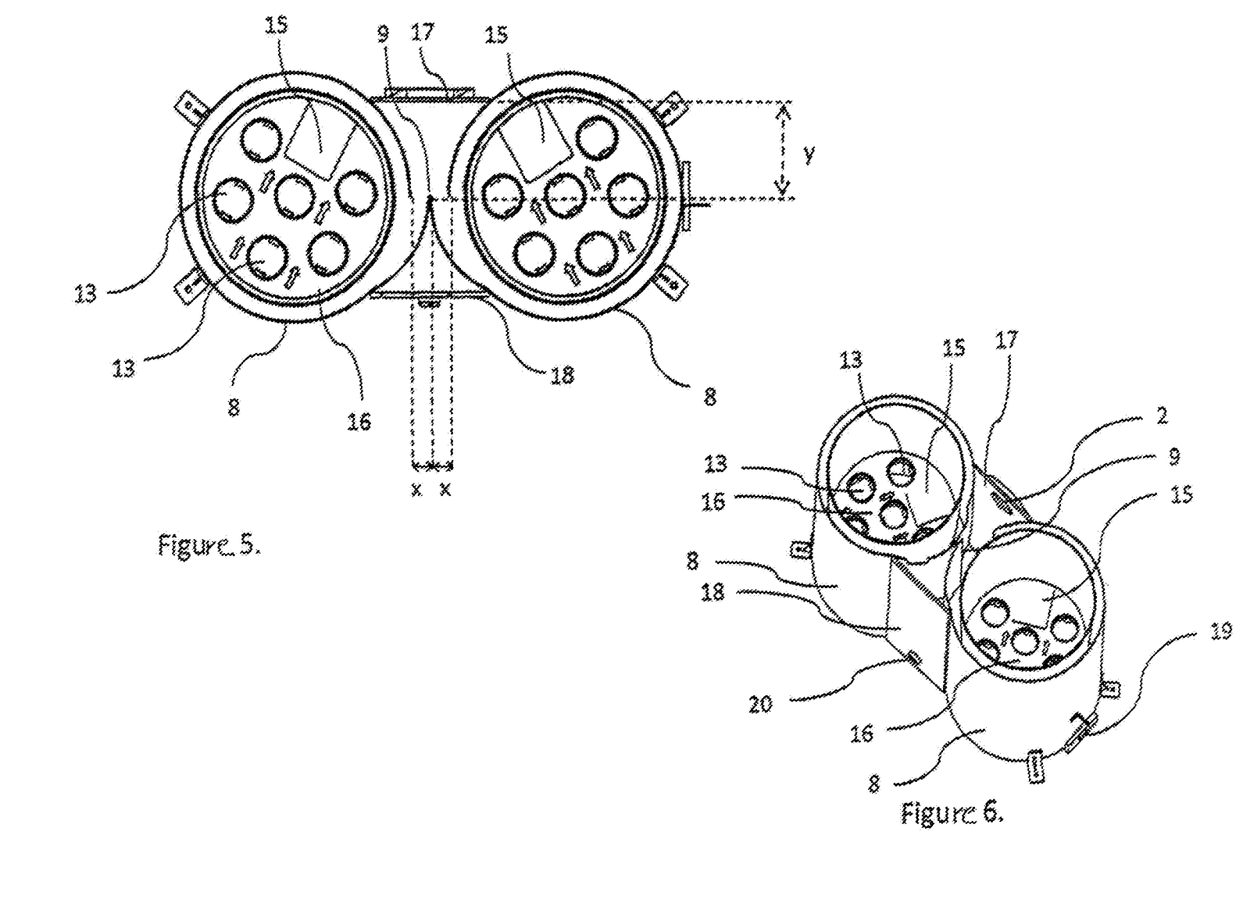
FIG. 6 discloses a rotated view of FIG. 5.

Preferably, said means can be in the shape of a hose or pipe, or the like. More preferably, said at least one of the two bucket shaped vessels 10 comprises one or more holes 13 at the bottom (FIG. 5, FIG. 6), for allowing fluid to pass there through and to be directed towards said outlet opening 4.

In another preferred embodiment, the device 1 further comprises at least one liquid filter 14 mounted in each of said one or more holes 13. Because the fluid stream is traversing the distance y, the fluid passage 11, surrounding the bucket shaped vessels 10 and is afterwards directed through at least one liquid filter 14 before reaching the outlet opening 4, preferably the device 1 achieves a liquid concentration at the level of the outlet opening 4 of approximately 5 mg/m$^3$ or less for the whole working range of the vacuum pump or compressor.

In another preferred embodiment, for an increased efficiency of the device 1, each of the at least two bucket shaped vessels 10 comprises more than one hole, such as up to 6 holes or even more, depending on the required capacity of the vacuum pump or compressor and/or the required concentration of liquid at the level of the outlet opening 4.

Preferably, for ease of manufacturing, the at least two bucket shaped vessels 10 have a circular or approximately circular cross-section.

In the context of the present invention it is to be understood that said at least two bucket shaped vessels 10 can have different diameters, or even can be of a different shape from one another or, each of the two communicating vessels 6 can comprise more than one bucket shaped vessel 10 of complementary shapes, such that at least a part of said communicating: vessel 6 is covered and that a fluid passage 11 is created between the wall of the bucket shaped vessels 10 and the lateral wall 8 of the communicating vessel 6.

Figure 10:
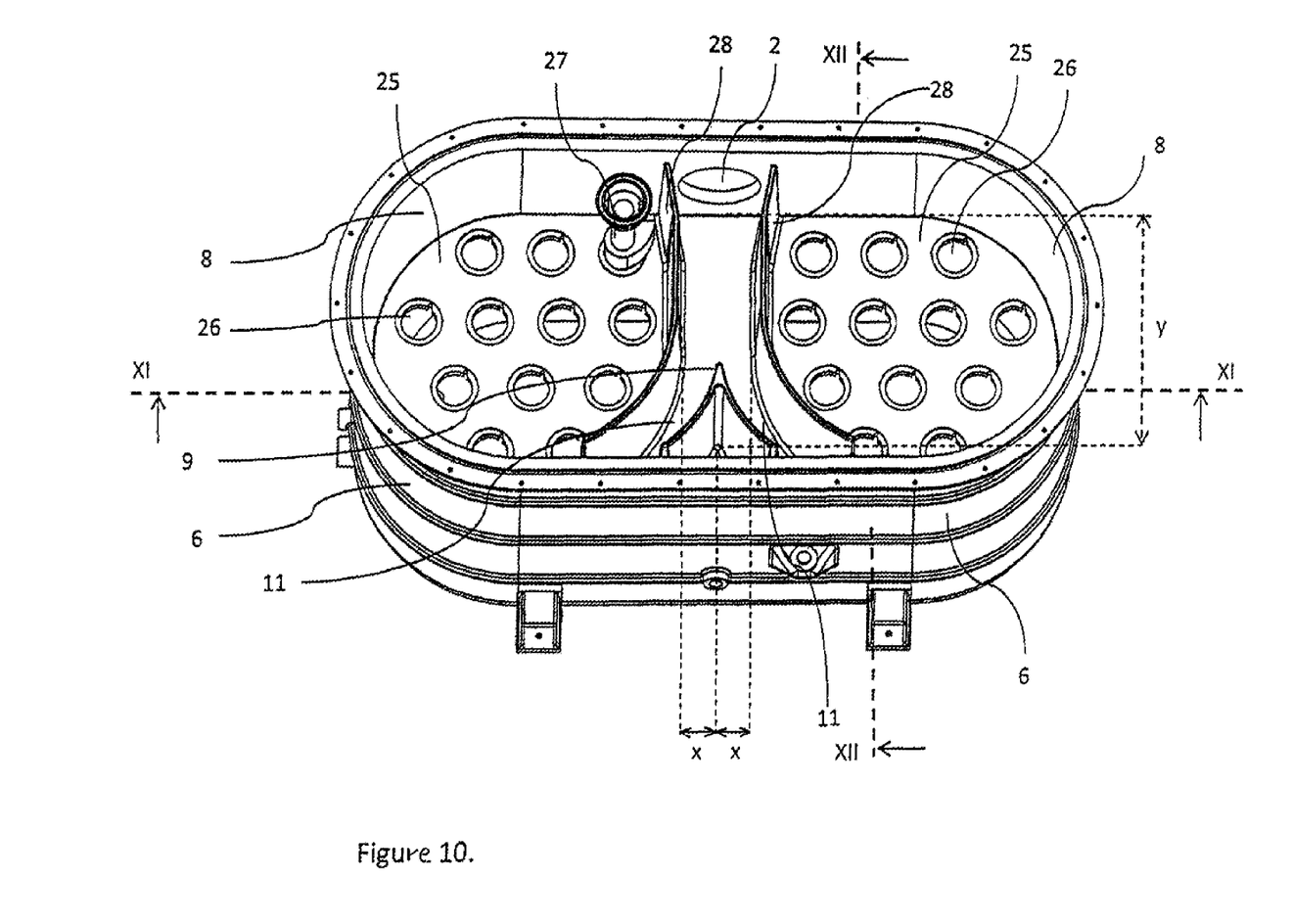
FIG. 10 schematically represents a device for separating liquid from a gas stream according to another embodiment of the present invention.

In another embodiment according to the present invention and as can be seen in FIG. 10, the bucket shaped vessels 10 can comprise a top plate 25 positioned in direct connection with the common section 9 and further comprising one or more holes 26, for allowing fluid to pass there through.

In the context of the present invention it should be understood that the common section 9 is part of the lateral walls 8 even if such common section is created from an additional piece or pieces of material fixed by for example welding, gluing and/or fixed mechanically with screws or bolts, onto the lateral walls 8.

Figure 11:
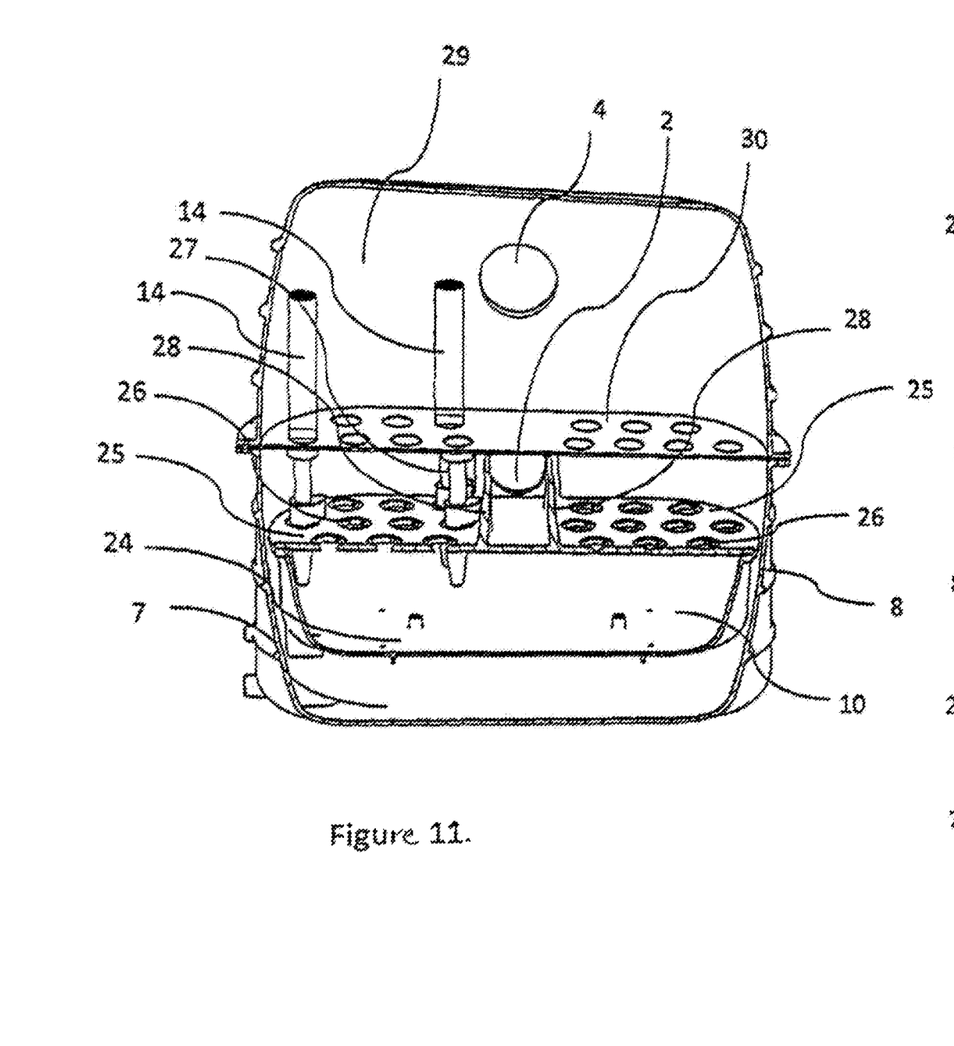
FIGS. 11 and 12 schematically represents a cross-section according to lines XI-XI and XII-XII in FIG. 10.

In the context of the present invention it should be understood that said bucket shaped vessels 10 can be adjoined to form one vessel 10 (FIG. 11).

Preferably, but not limiting to, if the bucket shaped vessels 10 comprise such a top plate 25, at least one of said bucket shaped vessel 10 can further comprise a second bottom plate 24 for allowing liquid to be collected thereon. Preferably, all bucket shaped vessels 10 comprise such a second bottom plate 24 for collecting liquid thereon. Said second bottom plate 24 can be a continuous plate.

Preferably, but not limiting to, said common section 9 is positioned onto thebetween the bottom plate 24 and the top plate 25 and continues above said top plate 25.

Figure 12:
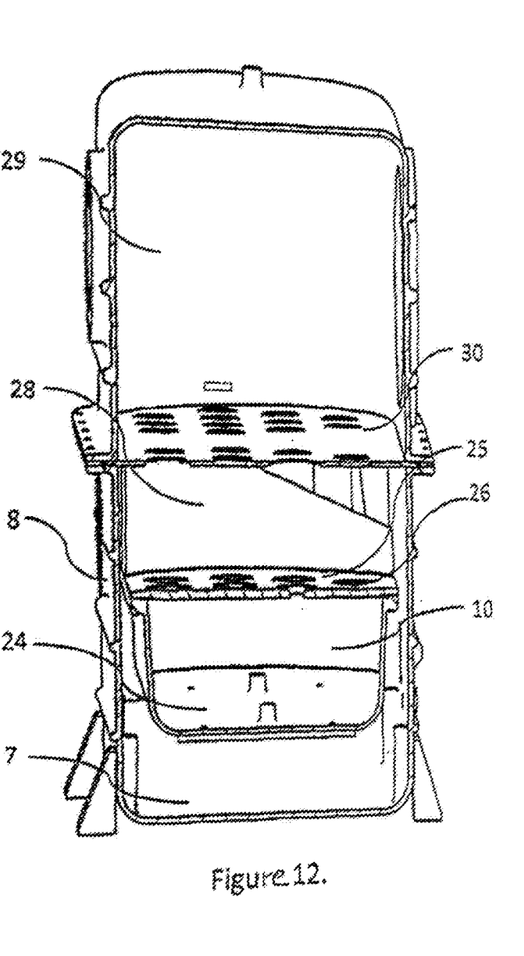

In another embodiment according to the present invention, the bucket shaped vessels 10 can further comprise at least one cyclone 27 mounted in one of the holes 26. More preferably, said bucket shaped vessels 10 comprise a cyclone 27 mounted in each of said one or more holes 26 (FIGS. 10 to 12).

When the bucket shaped vessels 10 have such a structure, the fluid entering through said inlet opening 2 travels until approximately the level of the top plate 25 before being guided through the inlet of said at least one cyclone 27.

In one embodiment according to the present invention each of the bucket shaped vessels 10 can comprise a plurality of cyclones 27 such as tor example a number of cyclones 27 selected between six and sixteen. Preferably, each of the bucket shaped vessels 10 comprises nine or twelve cyclones, depending on the capacity of the device 1.

In the context of the present invention a cyclone 27 should be understood as a structure designed to induce a rotational movement to a flow of fluid entering therein and separate liquid particles from said fluid flow. Because of the rotational movement and the centrifugal force, the liquid particles enter in contact with the walls of the cyclone structure and fall under the influence of the gravitational force. The remaining fluid flow is directed through an outlet of the cyclone structure.

In another embodiment according to the present invention, at least one of the two bucket shaped vessels 10 comprise an extension 28 positioned on the top plate 25 for directing the flow of fluid from the inlet opening 2 towards the fluid passage 11.

In the context of the present invention, the extension 28 can be considered to form part of the wall of the bucket shaped vessel 10 or can be considered as an additional element, fixed onto the top plate 25.

Preferably, but not limiting to, the extension 28 can for example be welded on the top plate 25 such that the fluid passage 11 is created between said extension 28 and the common section 9.

Furthermore, a fluid passage is further created between the lateral wall 8 of the two communicating vessels 6 and the wall of the bucket shaped vessels 10, wherein the liquid can drip and fall on the bottom plate 7. In the context of the present invention such fluid passage can be considered as forming part of the fluid passage 11.

Preferably, the top plate 25 is fixed to the lateral wall 8 of the communicating vessels 6 in such a way that it allows the formation of a non-continuous surface between the space delimited by the wall of the bucket shaped vessels 10 and the wall 8 of the communicating vessels 6.

Accordingly, the top plate 25 can be fixed through techniques such as welding, fixing through bolts or screws or gluing, etc. Such fixing techniques can be realized at a specific distance that can be calculated through design.

Preferably, each of the two bucket shaped vessels 10 comprises an extension 20 positioned on the top plate 25.

The extensions 28 of the two bucket shaped vessels 10 create a guiding path for the fluid entering through the inlet opening 2, such as for example a tunnel type of structure.

Because of such extensions 28, the fluid guided through said inlet opening 2 is not allowed to reach the cyclones 27 directly, but is guided towards the common section 9 and the fluid passage 11. Because of such a path, part of the liquid from said fluid flow will be collected on the top plate 25 and further guided to be collected on the bottom plate 7 of the two communicating vessels 6.

As seen in FIG. 10, said extension 20 preferably has one end fixed on the lateral wall 8 on the side comprising the inlet opening 2 and the other end fixed on the top plate 25 in the vicinity of the lateral wall 8, on the opposite side from said inlet opening 2. The two extensions 28, each fixed on the top plate 25 of one of the two bucket shaped vessels 10 are mounted such that each act as a barrier between the fluid flowing through the inlet opening 2 and the cyclones 27 comprised within the bucket shaped vessels 10.

Preferably, but not limiting to, the extension 28 shows a circular curve and extends until after the common section 9.

Because the extension 22 shows a circular curve, the flow of fluid entering through the inlet opening 2 will adopt a circular movement as it tries to reach the inlet of the cyclones 27, increasing the amount of liquid separated from the fluid flow along such a path.

Preferably, the common section 9 and the extension 28 extend approximately parallel on the surface on which both are present, the distance between these two elements delimiting a fluid passage 11 which helps in guiding part of the fluid flow within each of the two communicating vessels 6. Preferably, the two fluid flows entering the fluid passage 11 of the two communicating vessels 6 are approximately equal.

Preferably, said extension 28 is a continuous extension having a maximum height at the end fixed on the lateral wall 8 on the side comprising the inlet opening 2, wherein the height of said extension 28 is decreasing between said maximum height and a minimum height, the end having the minimum height being fixed on the top plate 25 in the vicinity of the wall 8, on the opposite side from said inlet opening 2 (FIG. 12). As an example, but not limiting to, said extension 28 can be in the shape of a fin which can be fixed on the top plate 25 with fixing means placed at certain intervals or can be fixed over its entire length on said top plate 25.

When the extension has the shape as described above, a minimum pressure drop is encountered within the device 1, which results in a minimum power needed by the motor to direct the clean fluid from the outlet of the cyclones 27 and towards the external network 5'. Accordingly, the difference between the power needed by the motor to direct the flow through the inlet opening 2 and the power needed to direct the flow of gas towards the external network 5' is very small, and because of this the device 1 is using the motor in an efficient way. Moreover, the lifespan of the motor is increased.

Tests have shown that, if such extension would have a constant height, the motor would need more power in order to overcome the counter pressure created within the device 1 when directing said fluid towards the external network 5'.

With the current set-up of the device 1, the fluid entering through the inlet opening 2 travels the distance y until reaching the common section 9 and further travels within the two communicating vessels 6 before reaching the inlet of the cyclones 27, and because of such a layout, a significant volume of the liquid comprised within said flow of fluid in already being separated from it.

Tests have shows that between approximately 80% and 90% of liquid is separated before the fluid reaches the inlet of the cyclones 27. Because such a big volume of liquid is separated within such a section it is preferred that the top plate 25 is continuous throughout this described path and that the liquid collected on the top plate 25 can be further guided and collected on the bottom plate 7 of the two communicating vessels 6, from which it can be further evacuated.

In another embodiment according to the present invention, for efficiently guiding the collected liquid towards the bottom plate 7 of the two communicating vessels 6, the top plate 25, throughout the described path can have an inclination angle, or in other words can have a slope.

Said slope can be e.g. of approximately 12% or said slope can be of approximately 14% or higher such that liquid would not stagnate on such section but would flow under the influence the gravitational force and its mass towards a space delimited by the wall of the bucket shaped vessels 10 and the wall 8 of the communicating vessels 6 and be further collected on the bottom plate 7.

In another embodiment according to the present invention, the top plate 25, within the space delimited by the extension 28 and the lateral walls 8, does not have an inclination, or at least a substantial inclination. In other words, the top plate 25 where the cyclones 27 are mounted does not have a slope. Because of this, the fluid that is collected on the top plate 25 during the functioning of the device 1 acts as a seal, separating the space delimited above the top plate 25 (where the cyclones 27 are being mounted) from the space delimited under the top plate 25, between the top plate 25 and the second bottom plate 24. Consequently, there is no pressure equalization between the two and delimited spaces and because of this, gas will not be directed from below the cyclones 27 and therefore from the space delimited between the top plate 25 and the common bottom plate 24, towards the outlet of the cyclones 27. In this way, the risk of having fluid reentering the gas stream is avoided.

For ease of manufacturing, preferably said top plate 25 does not comprise a slope on its entire surface.

In another preferred embodiment, and not limiting to, the top plate 25 having the cyclones 27 mounted thereon creates a leak tight barrier between the space delimited under the top plate 25, between the top plate 25 and the second bottom plate 24 and the space delimited above the top plate 25, between the top plate 25 and the lateral walls 8 of the two communicating vessels 6.

Tests have shown that the volume of fluid separated throughout the path delimited by the inlet opening 2 and the inlet of the cyclones 27 is much bigger than the volume of liquid separated by said cyclones 27. Typically, the cyclones 27 separate between approximately 9% and 19% of the liquid. Because of this it would be preferred that the liquid separated throughout the path delimited by the inlet opening 2 and the inlet of the cyclones 27 is collected in a different location than the liquid separated by said cyclones 27. Consequently, a better control of the volume of liquid extracted from the two communicating vessels 6 and the two bucket shaped vessels 10 is maintained. Moreover, the capacity of said means of extracting the liquid from the two modules can be selected differently, according to the typical volume of liquid collected within a unit of time.

In another embodiment according to the present invention, the device 1 further comprises a filter vessel 29 positioned between the space delimited by the outlet opening 4 and the common section 9, and onto which the lid 12 is preferably mounted. Said filter vessel 20 comprises a supporting plate 30 comprising at least one hole for receiving a liquid filter 14 therein.

Preferably, but not limiting to, said common section 9 is positioned between the top plate 25 and the supporting plate 30.

Preferably, but not limiting to, the supporting plate 30 comprises a number of holes which is equal to the number of cyclones 27 comprised within the bucket shaped vessels 10 and is further configured to receive a liquid filter 14 in each of said holes.

Said liquid filter(s) 14 can be mounted sued that the outlet of the cyclone(s) 27 is/are in fluid communication with the inlet of said filter(s) 14, or at a minimum distance from the outlet of said cyclone(s) 1427. By bringing the outlet of the cyclone(s) 27 in fluid communication with the inlet of the filter(s) 14, an efficient and predictable filtration is assured within the device 1.

In an embodiment according to the present invention, for achieving a better control over the pressure drop within the different sections of the device 1 and to better control the path of the liquid extracted from the fluid flow guided through the inlet opening 2, the common section 9 preferably extends over a height delimited by the space between the top plate 25 and the supporting plate 30.

In a preferred embodiment according to the present invention, the filter vessel 29 comprises one or more liquid filters 14, wherein each of said one or more liquid filters 14 is positioned in fluid communication with each of said one or more cyclones 27.

In another embodiment according to the present invention, in order to better control the amount of liquid separated from the fluid flow until such flow reaches the inlet(s) of the cyclone(s) 27, depending on the actual position of such cyclone(s) 27 onto the top plate 25, said inlet(s) can be rotated with respect to the direction of the fluid flow and/or with respect to each other. Because of this, it is assured that the fluid is not entering directly in the cyclone(s) 27, but a sufficiently long path is maintained for the fluid flow such that a bigger volume of liquid is separated. In such a way, the cyclone(s) 27 are much more efficient and the dimension of the device 1 and of the different component elements such as the bucket shaped vessels 10 or the cyclone(s) 27 can be kept to a minimum.

If the flow of fluid would be allowed to directly enter the inlet(s) of the cyclone(s) 27, this could increase the risk of having within said cyclones 27 a quantity of fluid that could influence their efficiency, or could even choke them.

Accordingly, the cyclones 27 positioned in the vicinity of the end of the extension 28 have their inlets preferably oriented such that the fluid cannot enter directly therein but would have to continue the circular movement and only after performing an almost full rotation within the communicating vessels 6, the fluid will enter within the cyclones 27. Furthermore, the cyclones 27 which are positioned further away from the point where the extension 28 ends, also have their inlets preferably oriented such that the fluid can enter therein after having traveled a sufficiently long distance within the communicating vessel 6.

In the context of the present invention it should be understood that such a layout is not restrictive for the implementation of the present invention and that other orientations for the inlets of the cyclones 28 can also be implemented, or such cyclones 28 can all have the same orientation of their inlets.

In a preferred embodiment, for ease of manufacturing and mounting of said cyclones 28, the inlets of the cyclones 28 are all oriented in the same direction, as seen in FIG. 10, but rotated with respect to the direction of the fluid flowing out of the fluid passage 11 and within the communicating vessels 6.

In another embodiment, the filter vessel 29 further comprises means to drain the liquid collected by said liquid filters 14. Said means can be of any type such as, for example, selected from a group comprising: a one way valve, a manually actuated valve, a hose or a pipe possibly but not necessarily connected to a suction device, or the like.

In another preferred embodiment, the only significant communication path between the bucket shaped vessels 10 and the outlet opening 4 is through said liquid filters 14. Because of this, the purity of the fluid flowing though the outlet opening 4 is maintained at very high levels.

Tests have shown that with such a layout, and when the device 1 is used to separate for example oil particles from an air flow, purities of the air of approximately 99.5% or even higher are achieved.

Depending on the type of the vacuum pump or compressor, said liquid can be oil, water or can have a different composition.

For an even more increased efficiency of the liquid separator, each of the at least two bucket shaped vessels 10 and/or the filter vessel 29 comprises a recess 15 on its bottom plate 16, or on the supporting plate 30, for collecting the liquid captured and drained-off by the liquid filter(s) 14 which is further dripping on said bottom plate 16, or on the supporting plate 30.

In another embodiment according to the present invention, said liquid filter(s) 14 can be replaced with cyclone(s) 27 comprising an inlet tangential to their wall and directing the fluid flow in a circular movement within said cyclone 27. Due to such a movement, the liquid is being removed because of the mechanical impact of the liquid particles with the walls of the cyclones 27, because of the action of the centrifugal force induced upon it and, because of the gravitational force, the liquid droplets are collected at the bottom of the cyclone(s) 27 and the rest of the fluid is directed through an outlet opening and further used.

The device for separating liquid according to the present invention further comprises means for removing the liquid from, said recess 15, selected from a group comprising: a hose or a pipe connected to a device 1 capable of extracting the liquid through suction, a hose or a pipe for allowing the liquid to be removed though gravitational force, or an orifice comprising a one way valve for allowing the liquid to drip onto the bottom plate 7 of the two communicating vessels 6.

In a preferred embodiment according to the present invention, the bottom plate 7 is a continuous plate which allows for a common space for the liquid to be collected from each of the two communicating vessels 6 and from the section y delimited by the inlet opening 2 and the common section 9.

For an increased rigidity of the liquid separator and according to one embodiment of the present invention, the device 1 further comprises a lateral plate 17, connecting the lateral walls 8 of the two communicating vessels 6 and comprising the inlet opening 2. Preferably, but not limiting to, the liquid separator can further comprise a second lateral plate 18, connecting the lateral walls 8 of two communicating vessels 6 on the exterior of said liquid separator and strengthening the structure where the common section 9 is being created.

Preferably, the lateral walls 8 create an angle before being adjoined to create the common section 9, said angle can be e.g. of approximately 90° or less.

For an easy and efficient functioning of the liquid separator, the device 1 further comprises means of draining the collected liquid 19 from the two communicating vessels 6, preferably positioned in the vicinity of the bottom plate 7 along the height H1 of the lateral wall 8, or directly on the bottom plate 7 of the two communicating vessels 6.

Said means of draining the collected liquid 19 can be of any shape, selected from a group comprising: a one way valve, a manually actuated valve, a hose or a pipe possibly but not necessarily connected to a suction device, or the like.

In another preferred embodiment according to the present invention, the bottom plate 7 of the two communicating vessels 6 is mounted such that it creates a slope or an angle if we were to intersect it with the horizontal axis A-A' (FIG. 1). Preferably, said slope has the lowest point of contact with the lateral wall 8 on the side comprising the liquid drainage 19 and the highest point of contact with the lateral wall 8 on the opposite side thereof.

Such a elope helps in generating a continuous flow of liquid, which enhances the probability of achieving an approximately constant temperature of the collected liquid on approximately the whole surface of the bottom plate 7. Moreover, in case impurities do occur within the collected liquid, they will be preferably directed towards the liquid drainage 19 and further filtrated, eliminating the risks of blockages within the vacuum pump or compressor.

For ease of checking or if said liquid separator comprises a manually actuating valve, the device 1 further comprises means of checking the liquid level 20 collected on the bottom plate 7 of the two communicating vessels 6. Preferably, said means of checking the liquid level 20 can be in the shape of an orifice comprising at least a partially transparent material such as for example glass or transparent plastic material.

In another embodiment according to the present invention, a minimum level of liquid, within the volume determined between the bottom plate and the bucket shaped vessels over the height $\Delta H$ ($\Delta H = H1 - H2$), is maintained at all times, such as for example until the highest point of the oil drainage 19, such that gas is not being recirculated within the vacuum pump or compressor.

If the vacuum pump or compressor is an oil injected vacuum pump or compressor, such a feature eliminates the risk of oil bubbles to appear, an unwanted effect when such oil is being afterwards injected in the vacuum pump for achieving oil injection.

In another embodiment said means for checking the liquid level can be in the shape of at least a sensor capable of generating an electrical signal whenever the level of fluid reaches or passes it. Said electrical signal can communicate with a user interface or a command panel situated on the vacuum pump or compressor or can send an alarm signal to a previously indicated electronic device through a wired or wireless transmission medium.

Test have shown that such a liquid separator achieves very good results within the entire working range of the vacuum pump or compressor.

Because the communicating vessels 6 comprise a common inlet opening 2, a common outlet opening 4 and because the volume determined between the bottom plate 7 of the two communicating vessels 6 and the bottom plate 16 of the at least two bucket shaped vessels 10 over the height $\Delta H$ ($\Delta H = H1 - H2$) comprises at least a communicating channel between said two communicating vessels 6, the two communicating vessels 6 are not equivalent to two vessels connected in parallel.

Another benefit of such a structural design is the fact that within the device for separating liquid an equalization of the liquid pressure and the pressure of the gas between the two communicating vessels 6 and within the volume determined between the bottom plate and the bucket shaped vessels 10 over the height $\Delta H$ ($\Delta H = H1 - H2$) happens at all times, which determines a continuous flow of liquid collected onto the bottom plate 7 and an approximately equal usage of the two vessels 8 at all times.

Accordingly, after the fluid is directed through the inlet opening 2, it will always be split in two different flows by the common section 9 which will generate an approximately equal usage of both communicating vessels 6. On the other hand, in a liquid separator comprising two vessels connected in parallel and having a common inlet opening, the fluid will choose the path with the lowest pressure value and tests have shown that a simultaneously usage of two vessels, independent of a common inlet, does not happen in such a case.

Figures 7, 8:
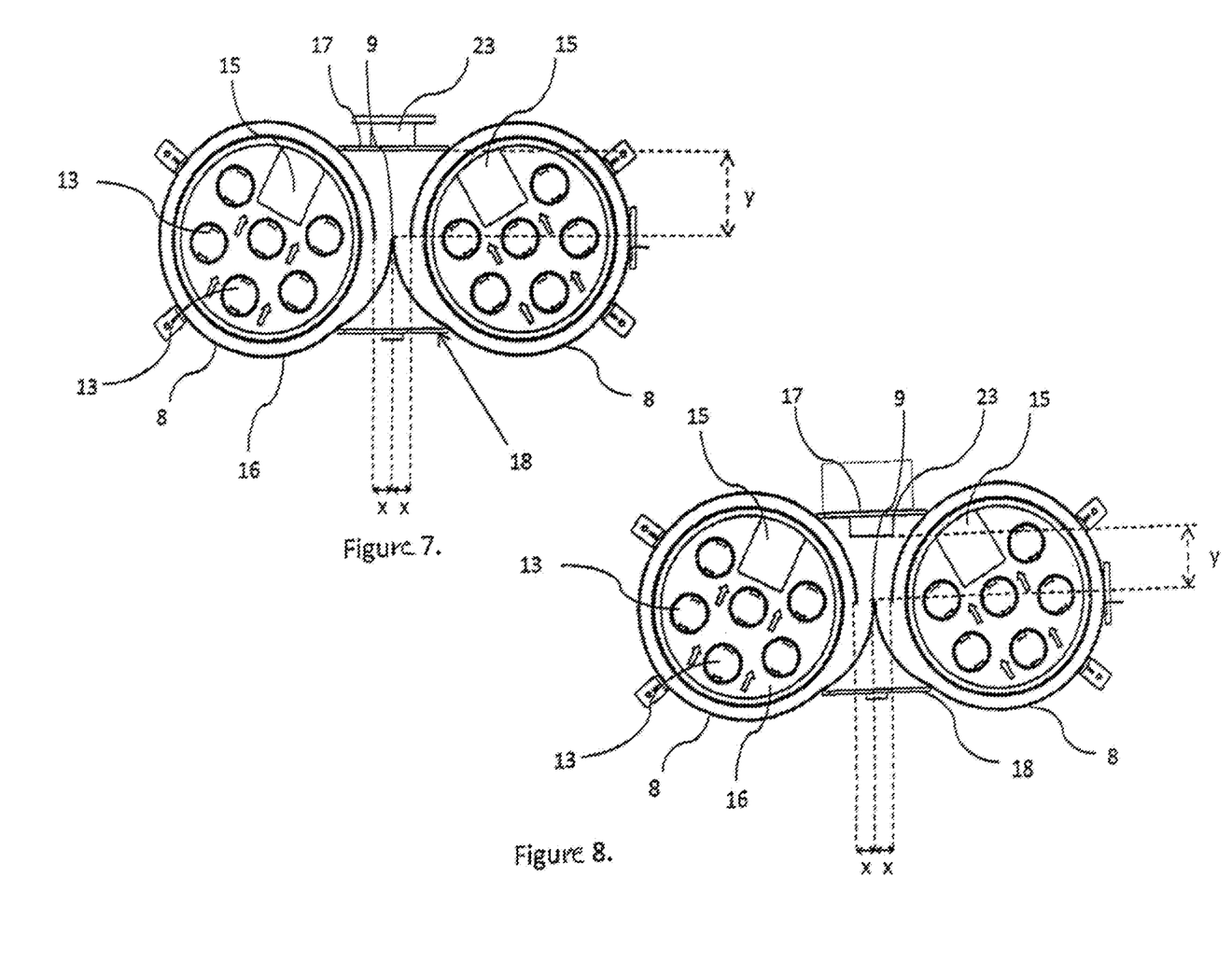
FIGS. 7 and 8 illustrate an alternate embodiment of the device shown in FIG. 5.

In another preferred embodiment according to the present invention, but not limiting to, the two lateral walls 8 comprise a further cut-up 22 on the side closest to the inlet opening 2 (FIG. 8). Such a structural feature allows the creation of a wider inlet and a possible reduction of the distance y. By creating said cut-up 22, the efficiency of removing liquid throughout the distance y is increased and at the same time, the influence of the cylindrical wall on the fluid flow that is directed through the inlet opening 2 is reduced.

If such a cut-up 22 would not be realized, the fluid flowing through the inlet 2 would be forced to traverse a narrow passage on the distance y until reaching the common auction 9, influencing the speed and pressure of the fluid and creating an unwanted effect on the behavior of the overall system.

If the system comprises a vacuum pump working in the low range of vacuum levels or a compressor, because the speed of the fluid flowing through the inlet 2 is high, the distance y can be reduced even more.

If the system comprises a vacuum pump working in the high range of vacuum levels, because the speed of the fluid flowing through the inlet 2 is low, it is preferred to maintain a distance y as big as possible.

In a preferred embodiment, if the distance y is increased, the height on the cut-up 22 will also be increased.

Preferably, but not necessarily, the common section 9 is placed at a minimum distance x from the lateral walls 8 (FIG. 2) to allow the formation of the fluid passage 11 on the complete outer surface of the bucket shaped vessels 10. If the inlet opening 2 is of a circular shape, said distance x can be for example approximately half of the diameter of said inlet opening 2. It is to be understood the distance x can be bigger or smaller than half of the diameter of the inlet opening 2 and that said inlet opening 2 can be of any shape.

It is preferred to maintain said distance x as small as possible such that the vortexes created as the fluid flows through the fluid passages 11 of each of the two communicating vessels 6, would not be increased.

In another embodiment according to the present invention, the device 1 further comprises an inlet pipe 23 having at one end thereof the inlet 2 (FIG. 7, FIG. 8).

Preferably, the vacuum pump or compressor further comprises a filter unit 21 (FIG. 4) used for filtering the liquid collected on to the bottom plate 7 and further drained and preferably cooling means (not shown) for reducing the temperature of said collected liquid if needed. Preferably, the vacuum pump or compressor further uses a thermostatic valve (not shown) for directing the collected liquid either through the cooling means and further through the filter unit 21 if the temperature of said liquid is higher than a set limit, or though the filtering unit 21 directly if the temperature of the liquid does not exceed a set limit. Because the temperature of the collected liquid is maintained at a relatively constant valve, the thermostatic valve is not fluctuating between the two possible choices of paths.

The present invention is further directed to a method for separating liquid from a gas stream within a liquid injected vacuum pump or compressor, said vacuum pump or compressor comprising two communicating vessels 6, said communicating vessels 6 having a bottom plate 7 and lateral walls 8 extending from said bottom plate 7 and having a height H1. The two vessels 6 are provided with a common section 9 extending over at least a part of said height H1, wherein the common section 9 is created by cutting said lateral wall 8 along the height H1 so as to create two wall parts and adjoining said wall parts over at least a part of said height H1 and positioning said common section 9 on the opposite side of an inlet opening 2. Preferably, within each of the two communicating vessels 6 is provided at least one bucket shaped vessel 10.

The two communicating vessels 8 are further provided with an outlet opening 4 positioned on the opposite side of said bottom plate 7.

The present method comprises the steps of directing a fluid flow through an Inlet opening 2 of said two communicating vessels 6, guiding said fluid through a fluid passage 11 provided between the wall 8 of each of the two communicating vessels 6 and the wall of each of the two bucket shaped vessels 10, and making use of the common section 9 to split the fluid flow from said inlet opening 2 into two flows directed through the fluid passage 11.

Because the fluid is guided in such a manner, liquid will be separated from the gas stream and will preferably be collected on the bottom plate 7.

Preferably, the two communicating vessels 6 are provided with a lid 12 placed on the opposite side of the bottom plate 7 and comprising the outlet opening 4. After the fluid passes through said fluid passage 11, it is directed through said outlet opening 4.

Figure 9:
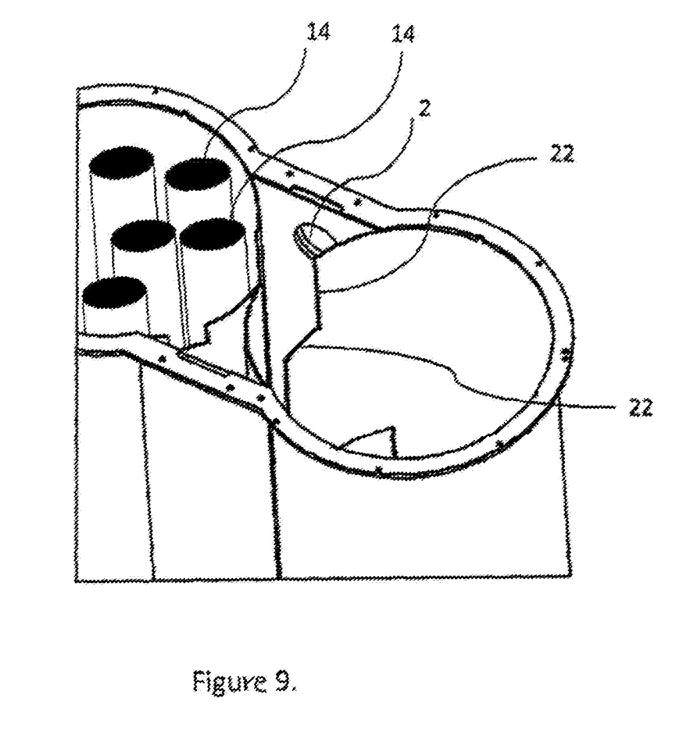
FIG. 9 represents yet another embodiment of the device shown in FIG. 6.

In the embodiment of FIG. 9, for achieving an even better filtration result, each of said at least one hole 13 is/are provided with a liquid filter 14 mounted within said hole(s) 13.

Because, after said filter 14 is saturated with liquid, it will typically begin to allow the liquid to drip on the external walls of the filter and into the bucket shaped vessels 10, said vessels 10 are preferably provided with a recess 15, for collecting said liquid captured and drained-off by said liquid filter(s) 14. Preferably, the at least two bucket shaped vessels 10 are further provided with means for extracting the liquid from said recess 15 in order to maintain a good functioning of the system.

In another preferred embodiment according to the present invention, at least one of the two bucket shaped vessels 10 is provided with at least one hole 26 on the top plate 25, wherein each of the at least one hole 26 is designed to receive a cyclone 27.

In this case, the method comprises the step of directing the fluid flow through the inlet opening 2 of said two communicating vessels 6, splitting the fluid flow with the help of the common section 9 in two fluid flows and guiding them through the fluid passage 11 of each bucket shaped vessel 10.

Preferably, the fluid passage 11 is being provided between the common section 9 and an extension 28 placed on the top plate 25 of the two bucket shaped vessels 10, said extension 28 acting as a barrier between the flow of fluid entering through the inlet opening 2 and the at least one cyclone 27 placed on the top plate 25.

Because of the extension 28, the fluid passing through the fluid passage 11 adopts a circular movement and maintains such movement after exiting the fluid passage 11 and as it passes within the space delimited by the two communicating vessels 6 and the two bucket shaped vessels 10 and wherein the cyclones 27 are mounted. Such a circular movement determines liquid to be separated from said fluid flow.

The method preferably further comprises the step of directing the flow of fluid through one or more cyclones 27 fixed on a top plate 25 after said flow of fluid passed through said fluid passage 11.

In another embodiment according to the present invention, each of said at least one hole 26 is/are provided with a cyclone 27 through which the fluid flow is directed.

Preferably, the inlets of said cyclones 27 are rotated with respect to the direction of the fluid flow entering the two communicating vessels 6 such that said fluid flow is allowed to travel a sufficiently long distance before reaching the inlet of the cyclones 27, due to which a bigger volume of liquid is separated. Because of this, a required purity of the fluid flowing through the outlet opening 4 is maintained.

Preferably, each of the bucket shaped vessels 10 is provided with a second bottom plate 24 on which the liquid separated by said cyclones 27 can be collected.

Further, the method preferably comprises the step of collecting the liquid dripping from said fluid between the inlet opening 2 and the end of the fluid passage 11 on the top plate 25, and further comprises the step of guiding the collected liquid on the bottom plate 7 of the two communicating vessels 6, from where it can be extracted in a subsequent step.

After the fluid exits said one or more cyclones 27, it is guided through the liquid filter(s) 14. The liquid collected by the cyclones 27 is allowed to drip onto the second bottom plate 24, and the remaining fluid flow is allowed to exit the cyclones 27 through an outlet opening.

Preferably the method comprises the step in which the flow of fluid exiting said cyclones 27 is directed through at least a liquid filter 14 placed or not in direct fluid communication with the outlet opening of the cyclones 27. Preferably, each of the cyclones 27 mounted on the top plate 25 comprises a liquid filter mounted such that the fluid exiting through the outlet opening of each cyclone 27 directly enters through an inlet of a liquid filter 14.

After passing through the liquid filter 14 the fluid flow is directed through the outlet opening 4.

In another embodiment according to the present invention, said bucket shaped vessels 10 are provided with means to remove the liquid collected on the second bottom plate 24. Said means can be selected from a group comprising: a one way valve, a manually actuated valve, a hose or a pipe possibly but not necessarily connected to a suction device, or the like.

For maintaining the system in working parameters, the method further comprises the step of removing at least part of liquid collected within the two communicating vessels 6, by using a liquid drainage 19. Preferably, such liquid is recirculated within the vacuum pump or compressor and used for example for achieving liquid injection.

The present invention is by no means limited to the embodiments described as examples and shown in the drawings, but the device for separating liquid from a gas stream can be realized in all kinds of variants, without departing from the scope of the invention.

The invention claimed is:

1. A device for separating liquid from a gas stream within a liquid injected vacuum pump or compressor, said device comprising:
   two communicating vessels having a bottom plate and a lateral wall extending from said bottom plate and having a first height, said two vessels having a common section along a back side of the two communicating vessels extending over at least a part of said height, wherein the common section is created by cutting said lateral wall along the height so as to create two wall parts and adjoining said wall parts over at least a part of said height;
   an inlet opening positioned on the opposite side of the common section along a front side of the two communicating vessels, wherein a distance is created between said inlet opening and the common section in a way such that the gas stream travels said distance before the gas stream is split into two separate flows by the common section into said two communicating vessels;
   at least two bucked shaped vessels, each provided within one of the two communicating vessels;
   a lid comprising an outlet opening wherein at least one of the two bucket shaped vessels forms a fluid passage between the wall of the communicating vessel and the wall of the bucket shaped vessel for allowing a fluid to pass there through.

2. The device according to claim 1, wherein at least one of the two bucket shaped vessels has a second height at least 10% smaller than the first height.

3. The device according to claim 2, wherein the bucket shaped vessels have a circular cross-section.

4. The device according to claim 1, wherein at least one of the two bucket shaped vessels comprises one or more holes at the bottom, for allowing fluid to pass there through.

5. The device according to claim 4, wherein said device further comprises a liquid filter mounted in each of said one or more holes.

6. The device according to claim 4, wherein at least one of the two bucket shaped vessels further comprises a recess for collecting the liquid drained-off by said liquid filter(s).

7. The device according to claim 6, wherein the bottom plate of the two communicating vessels creates a slope having the lowest point of contact with the lateral wall on the side comprising the liquid drainage and the highest point of contact with the lateral wall on the opposite side.

8. The device according to claim 1, wherein at least one of the two bucket shaped vessels comprises a top plate positioned in direct connection with the common section and further comprising one or more holes, for allowing fluid to pass there through.

9. The device according to claim 8, wherein said device further comprises a cyclone mounted in each of said one or more holes.

10. The device according to claim 9, further comprising means for removing the liquid from said recess.

11. The device according to claim 1, further comprising a continuous bottom plate and a lateral plate connecting the two communicating vessels and comprising the inlet opening.

12. The device according to claim 1, wherein the angle created by the two adjoined wall parts forming said common section is approximately 90° or less.

13. The device according to claim 1, further comprising a liquid drainage on the lateral wall of the two communicating vessels.

14. The device according to claim 1, further comprising an orifice for checking the level of the liquid within the two communicating vessels.

15. The device according to claim 1, further comprising a filter vessel positioned between the outlet opening and the common section.

16. The device according to claim 1, wherein at least one of the two bucket shaped vessels comprises an extension positioned on the top plate for directing the flow of fluid from the inlet opening towards the fluid passage.

17. The device according to claim 16, wherein each of the two bucket shaped vessels comprises an extension positioned on the top plate.

18. The device according to claim 1, wherein said inlet opening is connected to a liquid injected vacuum pump or compressor.

19. A method for separating liquid from a gas stream within a liquid injected vacuum pump or compressor, said method comprising the steps of:
   providing two communicating vessels having a bottom plate and lateral walls extending from said bottom plate and having a first height, said two vessels having a common section along a back side of the two communicating vessels extending over at least a part of said height, wherein the common section is created by cutting said lateral wall along the height so as to create two wall parts and adjoining said wall parts over at least a part of said height and positioning said common section on the opposite side of an inlet opening along a front side of the two communicating vessels;

providing at least one bucked shaped vessel within each of the two communicating vessels;

providing a fluid passage between the wall of each of the two communicating vessels and the wall of each of the two bucket shaped vessels for allowing a fluid to pass there through;

directing a fluid flow through said inlet opening and splitting the fluid flow from said inlet opening into two flows directed through the fluid passage wherein a distance is created between said inlet opening and the common section in a way such that the gas stream travels said distance before the gas stream is split into two separate flows by the common section into said two communicating vessels;

collecting the liquid dripping from said fluid flowing through the two communicating vessels on the bottom plate; and providing a lid comprising an outlet opening and directing the fluid passing through said fluid passage through the outlet opening.

20. The method according to claim 19, further comprising the step of providing at least one hole at the bottom of at least one of the two bucket shaped vessels for directing the fluid flow there through.

* * * * *